United States Patent
Hein et al.

(10) Patent No.: US 11,100,684 B2
(45) Date of Patent: Aug. 24, 2021

(54) APPARATUS AND METHOD FOR ARTIFACT DETECTION AND CORRECTION USING DEEP LEARNING

(71) Applicant: Canon Medical Systems Corporation, Otawara (JP)

(72) Inventors: Ilmar Hein, Vernon Hills, IL (US); Zhou Yu, Vernon Hills, IL (US); Ting Xia, Vernon Hills, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 71 days.

(21) Appl. No.: 16/509,408

(22) Filed: Jul. 11, 2019

(65) Prior Publication Data

US 2021/0012543 A1    Jan. 14, 2021

(51) Int. Cl.
*G06K 9/00*    (2006.01)
*G06T 11/00*    (2006.01)
*G06T 7/00*    (2017.01)

(52) U.S. Cl.
CPC .......... *G06T 11/008* (2013.01); *G06T 7/0012* (2013.01); *G06T 2207/10088* (2013.01);
(Continued)

(58) Field of Classification Search
None
See application file for complete search history.

(56) References Cited

U.S. PATENT DOCUMENTS 9,668,699 B2    6/2017    Georgescu et al.
9,675,273 B2    6/2017    Gluncic
(Continued)

FOREIGN PATENT DOCUMENTS

| CN | 107871332 A | 4/2018 |
|---|---|---|
| CN | 107945132 A | 4/2018 |
| EP | 3 404 615 A1 | 11/2018 |

OTHER PUBLICATIONS

Zhang Y, et al. "A Hybrid Metal Artifact Reduction Algorithm for X-Ray CT."; Med Phys. Apr. 2013; 40(4):041910. doi: 10.1118/1.4794474.
Shen, et al. "Deep Learning in Medical Image Analysis"; Annu. Rev. Biomed Eng. Jun. 21, 2017; 19: 221-248; doi:10.1146/annurev-bioeng-071516-044442.
(Continued)

*Primary Examiner* — Shervin K Nakhjavan
(74) *Attorney, Agent, or Firm* — Oblon, McClelland, Maier & Neustadt, L.L.P.

(57) ABSTRACT

A method and apparatus are provided that use deep learning (DL) networks to reduce noise and artifacts in reconstructed computed tomography (CT), positron emission tomography (PET), and magnetic resonance imaging (MRI) images. DL networks are used in both the sinogram and image domains. In each domain, a detection network is used to (i) determine if particular types of artifacts are exhibited (e.g., beam-hardening artifact, ring, motion, metal, photon-starvation, windmill, zebra, partial-volume, cupping, truncation, streak artifact, and/or shadowing artifacts), (ii) determine whether the detected artifact can be corrected through a changed scan protocol or image-processing techniques, and (iii) determine whether the detected artifacts are fatal, in which case the scan is stopped short of completion. When the artifacts can be corrected, corrective measures are taken through a changed scan protocol or through image processing to reduce the artifacts (e.g., convolutional neural network can be trained to perform the image processing).

19 Claims, 9 Drawing Sheets

(52) U.S. Cl.
CPC ............... *G06T 2207/10104* (2013.01); *G06T 2207/20081* (2013.01); *G06T 2207/20084* (2013.01)

(56) References Cited

U.S. PATENT DOCUMENTS

| | | | |
|---|---|---|---|
| 9,875,527 B2* | 1/2018 | Yu | G06T 11/008 |
| 9,965,863 B2 | 5/2018 | Xu et al. | |
| 10,074,038 B2 | 9/2018 | Hsieh et al. | |
| 10,867,415 B1* | 12/2020 | Korbin | G01N 23/04 |
| 2018/0018757 A1* | 1/2018 | Suzuki | A61B 6/03 |
| 2019/0035118 A1* | 1/2019 | Zhao | G06T 3/4076 |
| 2019/0073804 A1 | 3/2019 | Allmendinger | |
| 2019/0104940 A1* | 4/2019 | Zhou | G06T 11/008 |
| 2019/0261940 A1* | 8/2019 | Son | A61B 6/463 |
| 2019/0266728 A1* | 8/2019 | Lee | A61B 5/7221 |
| 2019/0328348 A1* | 10/2019 | De Man | G06T 5/40 |
| 2020/0027252 A1* | 1/2020 | Ye | G06T 11/005 |
| 2020/0043204 A1* | 2/2020 | Fu | G06N 3/0454 |
| 2020/0273215 A1* | 8/2020 | Wang | A61B 3/14 |
| 2020/0349449 A1* | 11/2020 | Wang | G06T 11/00 |
| 2020/0357148 A1* | 11/2020 | Soons | G06T 3/4076 |

OTHER PUBLICATIONS

Tanja Elss, et al. "Deep-Learning-based CT Motion Artifact Recognition in Coronary Arteries"; SPIE Proc. Medical. Imaging; Philips Research Hamburg, Digital Imaging; Hamburg University of Technology; Feb. 13, 2018.

Li-ping Zhou, et al. "Deep Learning Based Beam Hardening Artifact Reduction in Industrial X-Ray CT"; CT Theory and Applications, vol. 27; No. 2; Apr. 2018.

Yambo Zhang, et al. "Convolutional Neural Network based Metal Artifact Reduction in X-ray Computed Tomography"; IEEE Trans. Med. Img. 37(8), Jun. 2018.

Lars Gjesteby, et al. "Reducing Metal Streak Artifacts in CT Images via Deep Learning: Pilot Results"; The 14th International Meeting Fully 3D Image Reconstruction in Radiology and Nuclear Medicine, Jun. 2017.

W Stefan, et al. "Automatic Detection of Ring and Streak Artifacts in Routine CT QC Images"; J. Med Phys, vol. 40(6), Jun. 2013.

G Bouilhol, et al. "Motion Artifact Detection in Four-Dimensional Computed Tomography Images" J. Phys.: Conference Series 489; 2014.

Albert Phang, et al. "Automated Recognition of X-Ray CT Artefacts in Aerospace Components" 5th International Symposium on NDT in Aerospace, Nov. 2013.

* cited by examiner

APPARATUS AND METHOD FOR ARTIFACT DETECTION AND CORRECTION USING DEEP LEARNING

FIELD

This disclosure relates to using deep learning (DL) networks to improve the image quality of reconstructed medical images, and, more particularly, to using DL networks to reduce noise and artifacts in reconstructed computed tomography (CT), positron emission tomography (PET), and magnetic resonance imaging (MRI) images.

BACKGROUND

Computed tomography (CT) systems and methods are widely used, particularly for medical imaging and diagnosis. CT systems generally create images of one or more sectional slices through a subject's body. A radiation source, such as an X-ray source, irradiates the body from one side. At least one detector on the opposite side of the body receives radiation transmitted through the body. The attenuation of the radiation that has passed through the body is measured by processing electrical signals received from the detector.

A CT sinogram indicates attenuation through the body as a function of position along a detector array and as a function of the projection angle between the X-ray source and the detector array for various projection measurements. In a sinogram, the spatial dimensions refer to the position along the array of X-ray detectors. The time/angle dimension refers to the projection angle of X-rays, which changes as a function of time during a CT scan. The attenuation resulting from a point in the imaged object will trace out a sine wave around the vertical axis. Those points farther from the axis of rotation generate sine waves with larger amplitudes, and the phase of the sine waves corresponds to the angular positions of objects around the rotation axis. Performing an inverse Radon transform—or any other image reconstruction method—reconstructs an image from the projection data in the sinogram.

Similar to X-ray CT, medical imaging can be performed using positron emission tomography (PET) and single photon emission CT (SPECT). In PET imaging, a tracer agent is introduced into the patient, and the physical and biomolecular properties of the agent cause it to concentrate at specific locations in the patient's body. The tracer emits positrons, resulting in an annihilation event occurs when the positron collides with an electron that produces two gamma rays (at 511 keV) traveling at substantially 180 degrees apart.

PET imaging systems use detectors positioned around the patient to detect coincidence pairs of gamma rays. A ring of detectors can be used in order to detect gamma rays coming from each angle. Thus, a PET scanner can be substantially cylindrical to maximize the capture of the isotropic radiation of gamma rays. A PET scanner can be composed of several thousand individual crystals (e.g., Lutetium Orthosilicate (LYSO) or other scintillating crystal) that are arranged in two-dimensional scintillator arrays and packaged in modules with photodetectors to measure the light pulses from respective scintillation events. For example, the light from respective elements of a scintillator crystal array can be shared among multiple photomultiplier tubes (PMTs), or can be detected by silicon photomultipliers (SiPMs) having a one-to-one correspondence with the elements of the scintillator crystal array.

To reconstruct the spatio-temporal distribution of the tracer via tomographic reconstruction principles, each detected event can be characterized for its energy (i.e., amount of light generated), its location, and its timing. By detecting the two coincident gamma rays, and drawing a line between their locations, the line-of-response (LOR) can be determined, corresponding to the likely location of the original disintegration. Using the timing information, a time-of-flight (TOF) analysis can be used to narrow the likely location of the original disintegration to a statistical distribution (e.g., a Gaussian curve) along the LOR. While this process will only identify a line/region for the location of the original disintegration, by accumulating a large number of coincidence counts, a tomographic reconstruction process can estimate an image of the activity distribution (e.g., the tracer density within the patient).

As discussed above, the LOR for coincidence pairs and the timing information is used to reconstruct a tomographic image of the radioactivity, yielding clinical information. However, this clinical information can often be obscured by noise and/or scatter. Noise can be mitigated to a degree using various denoising methods, but some denoising methods can introduce artifacts into the image and produce non-uniform image quality depending on the noise level of the input image.

In addition to X-ray CT, PET, and SPECT, magnetic resonance imaging (MRI) is a common medical imaging modality that can be used to diagnose and monitor patients. Each of these medical imaging modalities can be susceptible to various imaging artifacts, such as motion artifacts.

Artifacts are not uncommon in medical images. Clinically, these artifacts can either obscure pathologies resulting in false negatives or be mistaken as pathologies resulting in false positives. Because artifacts in various medical imaging modalities often obscure and/or mimic pathology, artifacts can make clinical diagnoses difficult and/or prone to error. Such complications are amplified in high-resolution datasets acquired by, for instance, MRI and X-ray CT.

Even though some artifacts (e.g., artifacts from metal implants or ring and beam hardening artifacts) can be readily appreciated and corrected for at various stages of image acquisition and processing, there currently exist no mechanisms for automatic artifact detection and correction in the imaging workflow process. Instead, artifacts are often identified by a technologist after a patient has been scanned and then images have been reconstructed, which can lead to inefficiencies in which the patient who has already been dismissed is brought back in and the process is repeated of performing the imaging scan and then reconstructing the image. As a result, artifacts highlight clinical inefficiencies and contribute to long workflow times.

Sometimes the artifacts can be removed in prost-processing, so long as a user is able to recognize the artifact and select the appropriate algorithm to correct the particular artifact. Other times the artifact is too great to be effectively removed through image processing techniques, and the patient has to be rescanned. For example, small movements by a patient might be corrected, but a large movement might make the scan irrecoverable. If the scan is only determined to be irrecoverable much later, when the patient has been dismissed, significant time might be lost before another scan can be performed.

Further, it can be inefficient to rely on the expertise of an operator/technologist of the medical imaging scanner to detect artifacts and then apply artifact reduction methods to scanned data. For example, an inexperienced operator might not recognize what is and is not an artifact. Further, an operator might misidentify which type of artifact and therefore apply the wrong artifact-reduction method/algorithm, resulting in poor image quality. Further, a guess and check approach by trying different artifact reduction methods and seeing which one gives the best results can be time consuming and inefficient, especially because more than one type of artifact might be present in a given medical image.

Therefore, an automated method of detecting artifacts and correcting them as an integral part of the imaging chain would be beneficial in order to increase workflow efficiency and decrease workflow times for individual patients, thus increasing the number of patients that can be treated.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
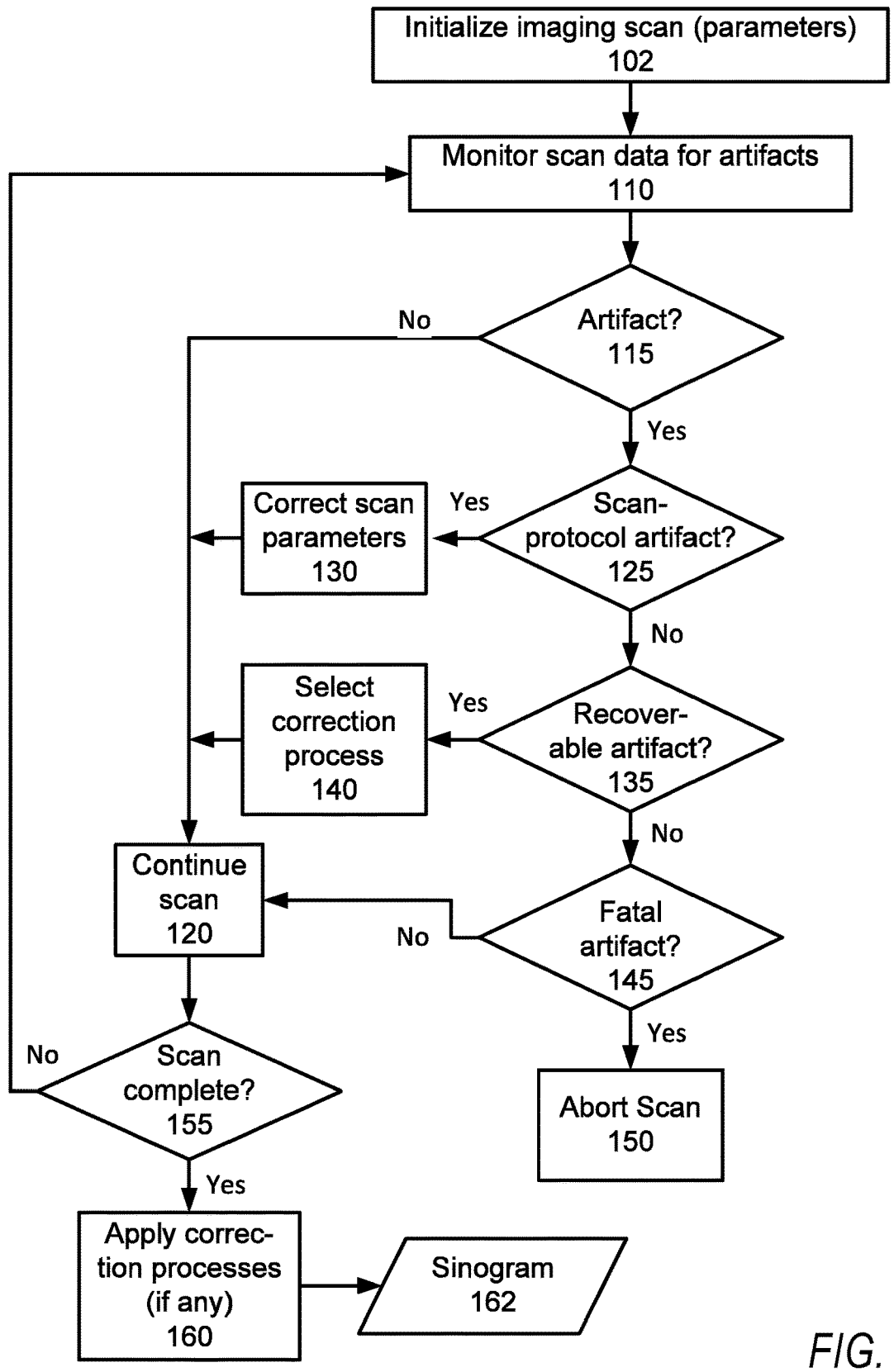
FIG. 1 shows a flow diagram of method for detecting and correcting artifacts in a medical-imaging scan by using one or more deep learning (DL) networks, according to one implementation.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

As discussed above, artifacts are commonly present in images generated by medical imaging modalities and often obscure and/or mimic pathology, making clinical diagnoses difficult and/or prone to error. Such complications are amplified in high-resolution datasets acquired by, e.g., magnetic resonance imaging and computed tomography (CT). CT datasets, in particular, are susceptible to artifacts that can be broadly categorized according to the suspected cause of the artifact, including (1) physics-based artifacts, (2) patient-based artifacts, (3) scanner-based artifacts, and (4) image reconstruction artifacts. Physics-based artifacts can include artifacts such as beam hardening, partial volume, photon starvation, and others resulting from the physics of data acquisition. Patient-based artifacts can be generated by motion, metal implants, truncation (e.g., patient anatomy outside of scanner field of view), and other patient-related factors. Scanner-based artifacts, including ring artifacts, can be due to detector element malfunction or calibration deficiencies. Image reconstruction artifacts can include cone beam artifacts, helical "windmill" artifacts, and others originating from an image reconstruction algorithm.

While some artifacts, such as ring and beam hardening artifacts and artifacts from metal implants, can be appreciated and corrected for at various stages of image acquisition and processing, there currently exist no mechanisms for automatic artifact detection and correction in the imaging workflow process. Instead, artifacts are often identified by a technologist after a patient has been scanned images have been reconstructed, which can lead to workflow inefficiencies in which the patient is again brought in to be rescanned, rather than immediately detecting and rectifying the problem. As a result, artifacts highlight clinical inefficiencies and contribute to long workflow times.

Therefore, an automated method of detecting artifacts and correcting them as an integral part of the imaging chain is beneficial to increase workflow efficiency and decrease workflow times for individual patients, thus increasing the number of patients that can be treated. These advantages are achieved by real-time, in situ monitoring of the sinogram data (and in certain implementations the reconstructed images) to detect and correct for artifacts in the scan data. These corrections can come in various forms, including: (i) post processing to remove artifacts, (ii) adjusting scan parameters/protocol, (iii) flagging data to be omitted from the scan, and (iv) stopping and restarting the scan from the beginning, when the data is deemed irrecoverable.

Various methods exist for feature identification and extraction in medical images. For example, computer vision and pattern recognition techniques can be used in image processing to detect patterns indicative of artifacts.

In contrast to the methods described herein, computer vision and pattern recognition techniques suffer from various limitations. In practice, computer vision and pattern recognition techniques have had limited success because they typically must be specially designed by human experts with extensive knowledge about the features under interest. Thus, each application is custom designed for a particular feature or scanner geometry, and each application requires considerable manual effort, and is not generalizable for other features.

The methods described herein overcome the above limitations by using deep learning (DL) networks (e.g., convolutional neural networks (CNN)). CNN and DL networks can be more robust and generalizable than previous computer vision and pattern recognition techniques. Accordingly, the methods described herein use DL networks (e.g., CNNs) to identify potential artifacts in X-ray CT data and images. In certain implementations, the inputs to the CNNs are image data and sinograms, and the output from the CNN is a list indicating which artifacts are present and in which part of the sinogram/image the artifact is present.

The methods described herein integrate artifact-detection CNNs into the CT scanner and image reconstruction workflow, and the integrated artifact-detection CNNs are used to decide workflow operations. These workflow operations decided by the artifact-detection CNNs can include decisions to abort a scan, which (if any) artifact-correction methods to apply, changes to the scan protocol to mitigate artifacts, and which reconstruction algorithm to use when reconstructing the CT image. For example, certain reconstruction algorithm can better minimize respective types of artifacts. Consider that, iterative reconstruction using a total-variation minimization (TV) regularizer can reduce streak artifacts.

Regarding the decision to abort a scan, if a severe artifact is present rendering an image entirely unsuitable for clinical use, there is no point in continuing the scan, and the scan is aborted and technologist/user notified. The signal/message that is sent to the technologist can include a list of possible causes with suggestions for remedies. Possible causes for aborting a scan include extreme patient motion; contrast not showing up in the image for a scan with contrast enhancement, or a system malfunction producing unusable images.

Regarding the decision of which artifact corrections to apply, if an artifact is detected which can be corrected, than an applicable artifact correction method is selected (e.g., a DL network that has been trained to correct that particular type of artifact) and is applied to correct the correctable artifact. Some examples of correctable artifacts include, e.g., metal artifact correction if metal artifacts are detected; truncation correction if truncation in detected, or iodine beam hardening correction if beam hardening detected in an iodine contrast enhanced cardiac scan.

Regarding the decision of which reconstruction algorithm to apply, if very high noise artifacts are detected for example, use a reconstruction algorithm which works well with low dose.

Regarding the decision how to change the scan protocol, if the artifact can be corrected by adjusting scan protocol, then the protocol is adjusted and a rescan is performed. The rescan can be performed automatically, or the technologist can be informed that a rescan is recommended before awaiting a signal from the technologist before starting the rescan. An example is if the dose is too low resulting in images which are too noisy.

In certain implementations, an image normality detection CNN is used as a final check before sending to a picture archiving and communication system (PACS). If images do not pass the final test, then the technologist is informed.

Referring now to the drawings, wherein like reference numerals designate identical or corresponding parts throughout the several views, FIG. 1 shows a flow diagram for a non-limiting example of a method 100 that uses a first deep learning (DL) network to monitor the acquisition of projection data for artifacts, and uses a second DL network to correct for detected artifacts.

In step 102 of method 100, an imaging scan is initialized. The imaging scan can be, e.g., an X-ray computed tomography (CT) scan, a positron emission tomography (PET) scan, a magnetic resonance imaging (MRI) scan, or a single photon emission CT (SPECT) scan. Initializing the scan can include setting various parameters for the scan, including, e.g., current and voltage settings for an X-ray tube, the scanner geometry (e.g., whether or not an anti-scatter grid is arranged before the detectors or which (if any) bow-tie filter is used to control the cone-beam angle), settings for the detector. Detector settings in X-ray CT might include, e.g., calibrations, amplifier gain settings, energy thresholds between energy bins of a photon counting X-ray detector, settings related to pile-up correction. Detector settings in a PET scanner might include, e.g.,, settings for energy and timing windows for correlated gamma rays in a gamma-ray detector.

In step 110 of method 100, as the scan data is acquired to generate a sinogram, the sinogram that has been generated so far (abbreviated as the "sinogram so far") is applied to a first DL network to generate various outputs. These outputs can include: (i) a determination of whether or not an artifact has been detected, (ii) if an artifact has been detected, a determination of whether or not the artifact is attributable to the scan protocol (i.e., would changing the scan protocol potential remedy the artifact), (iii) a determination of whether or not the artifact can be corrected through post-processing, and (iv) a determination of whether or not the artifact is sufficiently egregious that the imaging scan should be aborted.

In step 115 of method 100, an inquiry is performed regarding whether or not an artifact has been detected. If an artifact has been detected, then method 100 continues to step 125. Otherwise, method 100 continues from step 115 to step 120.

In step 120 of method 100, the imaging scan is continued to acquire additional data for the sinogram. Additional sinogram data is added/concatenated to the sinogram so far to generate an updated sinogram so far. Continued monitoring of the sinogram acquisition can be performed if the scan is not complete by continuing from step 120 to step 155 and then back to step 110, in which the updated sinogram generated so far is again applied to first DL network.

In step 125 of method 100, an inquiry is performed regarding whether or not the detected artifact is attributable to the scan protocol. That is, the inquiry asks if the detected artifact might be remedied by changing the scan protocol. If the artifact might be remedied by changing the scan protocol artifact, then method 100 continues to step 130. Otherwise, method 100 continues from step 125 to step 135.

In step 130 of method 100, in step 130 the scan parameters are adjusted to remedy the artifact. Indicia of how the scan parameter is to be changed can be included in the output from the first DL network.

In step 135 of method 100, an inquiry is performed regarding whether or not the artifact can be corrected through post-processing. If the artifact can be corrected through post-processing, then method 100 continues to step 140. Otherwise, method 100 continues from step 135 to step 145.

In step 140 of method 100, a process is selected for post processing the sinogram to correct the artifact. Indicia of which post processing algorithms will correct the artifact can be included in the output from the first DL network. The types of post processing algorithms that can used to correct respective types of artifacts are described with reference to FIG. 3.

In step 145 of method 100, an inquiry is performed regarding whether or not the artifact is bad enough that the imaging scan should be aborted. If the artifact satisfies aborting criteria, then method 100 proceeds to step 150 and the method is aborted, returning a signal to a user that a fatal artifact has been detected. At this point the user can take measures to correct the factors causing the artifact and repeat the scan. For example, a large movement by the patient in the middle of a scan could result in a fatal motion artifact. In this case, the technologist might instruct the patient to try not to move, and then the technologist can attempt to repeat the scan.

If the artifact does not satisfy the aborting criteria, then method 100 continues the imaging scan by proceeding to step 120. In this case, although the artifact exits, the reconstructed image is still likely to be of sufficiently high image quality to be clinically useful. That is, even if the image quality is not perfect because there are some residual artifacts that cannot be corrected, the image quality is nevertheless good enough. Accordingly, the scan is not aborted, but instead continues to step 120.

In step 155 of method 100, an inquiry is performed regarding whether the imaging scan is complete. If the scan is complete, method 100 proceeds to step 160. Otherwise, the imaging scan continues to be monitored by method 100 proceeding from step 155 to step 110. That is, continued monitoring of the sinogram acquisition can be performed if the scan is not complete by continuing from step 120 to step 155 and then back to step 110, in which the sinogram generated so far is again applied to first DL network.

In step 160 of method 100, the post-processing algorithms selected in step 140 to correct the artifact(s) are applied to the complete sinogram, and the corrected sinogram 162 is output from step 160.

In certain implementations, the sinogram 162 is then used to reconstruct a CT image, and artifact detection and correction can be performed in the sinogram domain, similarly to how it is performed in the sinogram domain using method 100.

Figure 2:
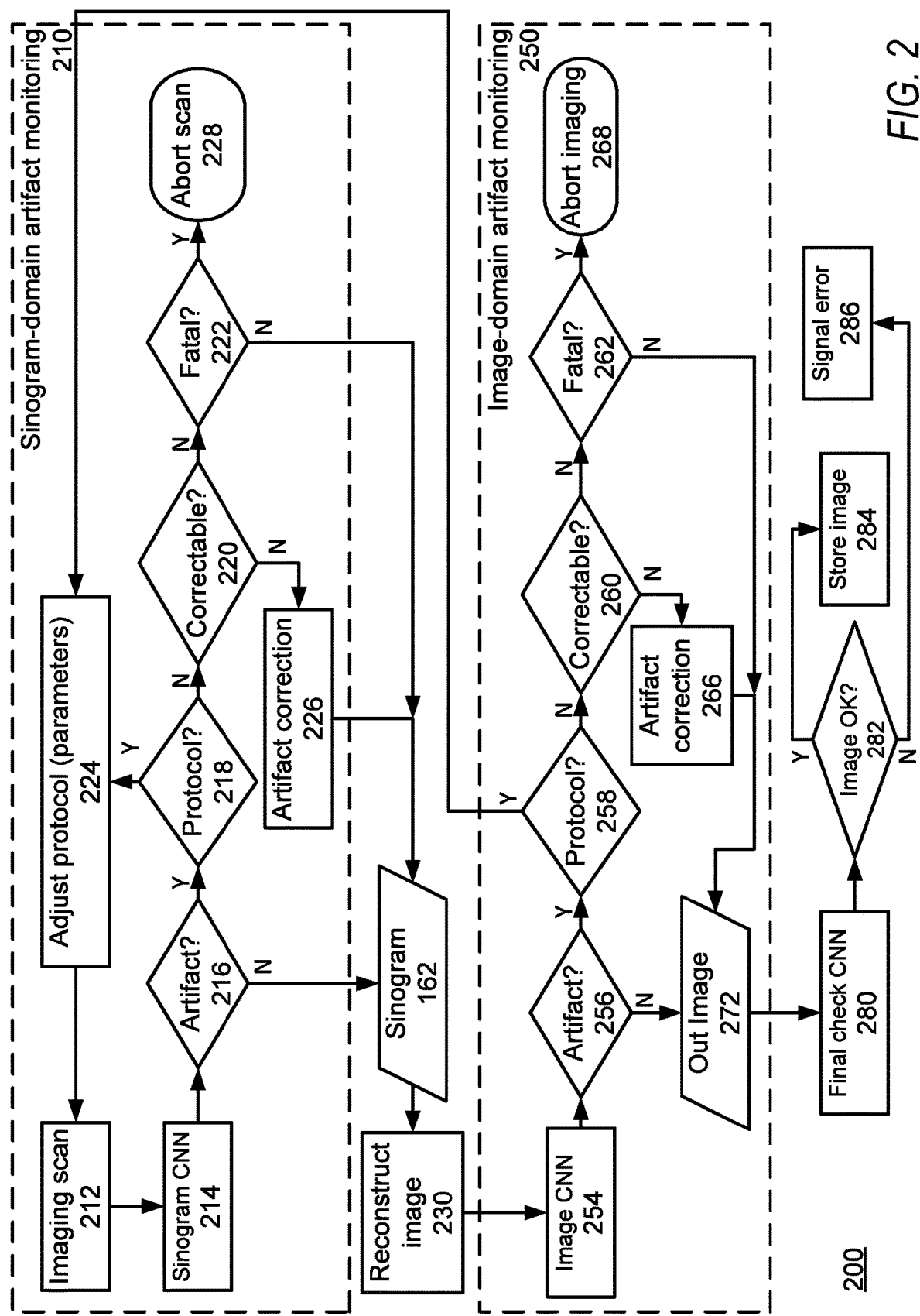
FIG. 2 shows a flow diagram of method for detecting and correcting artifacts in the image domain as well as in the sinogram domain, according to one implementation.

FIG. 2 shows a non-limiting example of a method 200 for performing artifact detection and correction in both sinogram and image domains. Process 210 shows the steps for performing artifact detection and correction in the sinogram domain, and process 250 shows the steps for performing artifact detection and correction in the image domain. In certain implementations, process 210 can be omitted, and the artifact detection and correction is performed only in the image domain. In other implementations, process 250 can be omitted, and the artifact detection and correction is performed only in the sinogram domain. In certain implementations, step 280 can be omitted, and method 200 can proceed directly from generating the output image 272 to step 284 in which the output image 272 is stored in the PACS.

In certain implementations, process 210 of method 200 has significant similarities to method 100.

In step 212 of process 210, an imaging scan is performed, which can be similar to step 102 and step 120 in method 100.

In step 214 of process 210, the sinogram that is acquired so far (i.e., sinogram so far) is applied to a sinogram convolutional neural network (CNN), which can be similar to the first DL network in method 100. Step 214 and step 212 can be ongoing concurrently with the imaging scan/concatenating/adding to the sinogram data at respective time intervals, and the sinogram that is acquired so far is applied to the sinogram CNN at the time intervals. For example, the sinogram so far can be applied to the sinogram CNN when the scan is 30%, 40%, 50%, 60%, 70%, 80%, 90%, and 100% complete. The output from the sinogram CNN can be similar to the output from the first DL network in method 100.

The inquiry in step 216 can be similar to the inquiry in step 115. The inquiry in step 218 can be similar to the inquiry in step 125. The inquiry in step 220 can be similar to the inquiry in step 135. The inquiry in step 222 can be similar to the inquiry in step 145.

In step 228, the scan is aborted when the artifacts detected in the sinogram satisfy the aborting criteria.

In step 226, if the artifact is determined to be correctable at step 220, then sinogram-domain artifact correction is applied to the sinogram. This artifact correction can be applied to the sinogram when the sinogram acquisition is complete, or can be applied to the sinogram so far. The sinogram-domain artifact correction can be performed by applying one or more sinogram-domain artifact-correction CNNs to the sinogram that has been determined to be affected by correctable artifacts. Some types of artifacts can be corrected using algorithms that do not include CNNs, as discussed below. In step 226, outputs from the sinogram CNN can be used to determine which artifact-correction CNNs are to be used based on the types of artifacts that are detected in step 216.

The result of process 210 is the complete sinogram 162. In step 230, a CT image is reconstructed from the sinogram 162. In process 250, image-domain artifact detection and correction is performed on the reconstructed CT image Process 250 of method 200 is similar to process 210 of method 200, except that the reconstructed image is used for artifact detection and correction, rather than the sinogram. Further, process 250 can be performed either on an image that has been reconstructed from the sinogram acquired so far (i.e., before the complete sinogram has been acquired), or on an image that has been reconstructed from a complete sinogram. Various methods can be used to reconstruct a CT image from an incomplete sinogram. For example, iterative reconstruction methods can be used to reconstruct an image from incomplete views. Further, as discussed in U.S. Pat. No. 7,751,524, incorporated herein by reference in its entirety, and discussed in U.S. Pat. No. 6,907,100, incorporated herein by reference in its entirety, image reconstruction for short-scan cone-beam (CB) CT can be performed using a method similar to the FBP method for full-scan CB CT, with a difference being that the projection data for short-scan CT are weighted according to the projection angle. This weighting of the projection data corrects for the unequal data redundancy of the short-scan data. For example, the Parker weights, among others, can be used for a half-scan (i.e., a scan of $180°+2\gamma$, where $\gamma$ is the half fan angle).

In one implementation, the Feldkamp method is used to reconstruct images from CB CT projection data. In the Feldkamp method, a convolution-backprojection formula is used for direct reconstruction of a three-dimensional density function from a set of two-dimensional projections. Feldkamp's approach was derived as a heuristic generalization of the classical two-dimensional fan-beam reconstruction method.

One important issue in the context of three-dimensional CB image reconstruction is the question under which circumstances accurate reconstruction of the image $f$ is possible. Among several contributions to this issue, Tuy's formulation of the CB data sufficiency criterion has gained the most attention. Tuy's sufficiency criterion states that theoretically-exact and stable CB reconstruction at a point (x,y,z) is possible, if and only if almost every plane through (x,y,z) has at least one intersection with the source trajectory.

Numerical algorithms for accurate CB reconstruction from data that satisfies Tuy's sufficiency condition can be composed by a direct implementation of, e.g., the Feldkamp method discussed above with the modifications developed by Grangeat. Applying the Grangeat formulation to each acquired CB projection successively delivers the intermediate Radon function throughout the three-dimensional Radon domain.

Clack and Defrise and also Kudo and Saito both suggested schemes to find such FBP-type CB reconstruction algorithms for a variety of source trajectories. One important ingredient in these schemes is a weighting function, which needs to be adapted to the considered source trajectory, and accounts for redundancies in the intermediate Radon function that can be obtained from the given CB data set. The resulting numerical CB reconstruction algorithms are based on a shift-variant filtering step and a subsequent three-dimensional weighted CB backprojection of the filtered data; these FBP methods allow accurate reconstruction, as long as the considered CB data is non-truncated and also satisfies Tuy's sufficiency condition. Another breakthrough in CB reconstruction theory was achieved by Katsevich, who suggested a novel general scheme to derive image reconstruction algorithms for theoretically-exact reconstruction from CB data that satisfies Tuy's sufficiency condition. This scheme is related to the ones described in the previous paragraph, which also requires a proper definition of a redundancy weighting function to find a practical algorithm for a given source trajectory. In contrast, Katsevich's method enables the composition of FBP algorithms for many practically relevant scenarios. These FBP algorithms achieve data filtering by a shift-invariant one-dimensional convolution along specific filter directions. Therefore, these FBP algorithms are more efficient than conventional algorithms and, in general, more flexible with respect to truncation in the CB data, depending on the required filter directions. In recent years, a variety of attractive reconstruction algorithms have been derived from Katsevich's general theory, including: helical source trajectories, circle-plus-arc trajectories, and the ellipse-plus-oblique-line trajectory, to name only a few.

In view of the above, process 250 can be initiated using a reconstructed image generated even before the imaging scan is complete by reconstructing an image from the sinogram acquired so far, even if the sinogram acquired so far is incomplete (e.g., missing a range of views). In PET imaging, the sinogram acquired so far can have complete views but poorer statistics than a complete sinogram.

In other implementations, process 250 can be initiated after the complete sinogram data is acquired.

In step 254 of process 250, the reconstructed image is applied to a image-domain CNN (abbreviated as the image CNN). Step 254 and step 212 can be performed more than once at predefined time intervals (e.g., when the scan is 30%, 40%, 50%, 60%, 70%, 80%, 90%, and 100% complete). The output from the image CNN can be similar to the output from the sinogram CNN (e.g., the output from the image CNN can include indications of whether an artifact is detected, which artifacts are detected, whether the artifact is attributable to the scanning protocol, whether the artifact is correctable, and whether the artifact is fatal).

The inquiry in step 256 can be similar to the inquiry in step 216, except that inquiry is based on the reconstructed image rather than the sinogram. Similarly, the inquiries in steps 258, 260, and 262 can be similar to the inquiry in steps 218, 220, and 222, respectively, except that steps 258, 260, and 262 are based on the reconstructed image rather than the sinogram.

In step 268, the scan is aborted when the artifacts detected in the image satisfy the aborting criteria for image artifacts.

In step 266, if the artifact is determined to be correctable at step 260, image-domain artifact correction is applied to the image. This artifact correction can be applied to the image when the sinogram acquisition is complete, or can be applied to an image reconstructed from the sinogram so far. The image-domain artifact correction can be performed by applying one or more image-domain artifact-correction CNNs to the image that has been determined to be affected by correctable artifacts. Outputs from the image CNN can be used to determine which artifact-correction CNNs are to be used in step 266.

The result of process 250 is the output image 272.

In step 280, a final check is performed on the image 272 to determine whether or not the artifact detection and correction processes have been successful in generating a clinically relevant image, or if the resultant image 272 still has artifacts and/or noise that might reasonably lead to a misdiagnosis. If the image is okay (i.e., the image 272 is of sufficient image quality to be clinically relevant), then method 200 proceeds from step 282 to step 284 and the image 272 is stored, e.g., in a picture archiving and communication system (PACS) to be recalled later and viewed by a radiologist, for example. Otherwise, method 200 proceeds from step 282 to step 286 and an error is signalled, alerting the user that the imaging scan failed.

Multiple steps in methods 100 and 200 can be performed using DL networks, including steps 110 and 160 in method 100 and steps 214, 226, 254, and 266 in method 200. In each of these cases, the DL networks can be trained using an appropriate set of training data. In each case, the training data is selected to have input data paired with target data. Each of the DL networks is trained by applying pieces of the input data (e.g., a sinogram or reconstructed image, depending on which domain, i.e., image or sinogram, the DL network is used in) to the respective DL network to generate an output, and then using a loss function to compare the output from the DL network to the corresponding target data. The DL network is trained by iterative adjusting weighting coefficients of the network to minimize the loss function.

Figure 3:
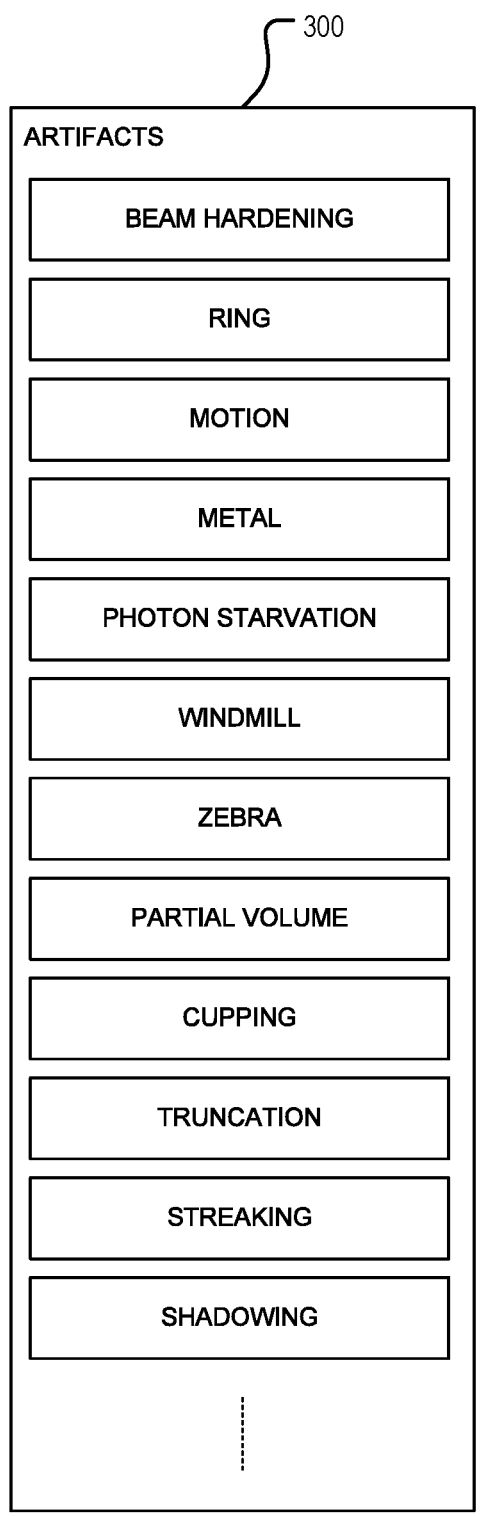
FIG. 3 shows a diagram of artifacts that are to be detected and corrected, according to one implementation.

For example, for the sinogram CNN and the image CNN in steps 214 and 254, respectively, the outputs can include determinations of whether an artifact has been detected. This determination can be a binary result (i.e., yes or no) indicating whether an artifact has been detected, or can be a range of values indicating different degrees to which respective artifacts are present. Further, this determination can be multiple values, each value corresponding to a different type of artifact. FIG. 3 shows an artifact table 300, listing several different artifacts, including, (i) beam hardening, (ii) ring, (iii) motion, (iv) metal, (v) photon starvation, (vi) windmill, (vii) zebra, (viii) partial volume, (ix) cupping, (x) truncation, (xi) streaking, and (xii) shadowing artifacts. The outputs from the sinogram CNN and the image CNN can include respective values for each type of artifact in table 300, representing the degree to which that type of artifact is present in the sinogram and/or reconstructed image.

Some types of artifacts can be easier to detect and/or correct in the sinogram domain, while other types of artifacts can be easier to detect and/or correct in the image domain. Accordingly, the outputs from the image CNN can address a first subset of the types of artifacts in table 300, and the outputs from the sinogram CNN can address a second subset of the types of artifacts in table 300. In certain implementations, there can be overlap between the first subset and the second subset of the types of artifacts in table 300.

In steps 216 and 256, the determination of whether or not a given type of artifact is present can be based on whether the indicia from the CNN for that type of artifact exceed a predefined detection threshold. For example, a motion artifact in the sinogram is detected when the sinogram CNN outputs motion-artifact indicia from one or more motion-artifact output nodes (i.e., output neurons of the sinogram CNN) that exceed a predefined detection threshold for the motion artifact. In certain implementations, a first sinogram CNN can be trained and applied to sinograms that are 50% complete, whereas a second sinogram CNN can be trained and applied to sinograms that are 60% complete, and so forth. Alternatively, a single sinogram CNN can be trained and applied to the sinograms regardless of what percentage of the scan has been completed.

For the target data, a user can manually review, analyse, and label the input data with values indicating the degree to which the input data exhibits a particular type of artifact (or in certain implementations label the input data with the binary determination of whether or not they exhibit a particular type of artifact). The DL networks (e.g., the sinogram and image CNNs) are then trained to match as closely as possible the determinations in the target data, which were manual determined by the user.

In training the artifact-correction CNNs for the sinogram domain and the image domain, the target data will be respectively sinograms and images that do not exhibit the artifacts. Accordingly, the artifact-correction CNNs will be trained to correct the artifacts. One CNN can be trained to correct a particular type of artifact, or to simultaneously correct multiple types of artifacts. Thus, depending on which types of artifacts are detected, an appropriate CNN is selected to correct the artifact. If more than one type of artifact is detected, multiple artifact-correction CNNs can be used, each to correct a respective type of artifact that has been detected.

Certain types of artifacts can be handled through changes to the scanning protocol. For example, a photon-starvation artifact can be handled by increasing the X-ray flux through changing the parameters of the scanning protocol (e.g., changing the current and/or voltage of the X-ray tube). Additionally, a truncation artifact can be handled by increasing the cone beam angle of an X-ray beam (e.g., by using a different bow-tie filter). Accordingly, the steps 218 and 258 can use the determinations of whether or not protocol related artifacts are present to determine whether the protocol should be changed, and, if so, to determine how the protocol should be changed.

In steps 220 and 260, correctable thresholds can be used to determine whether particular artifacts are within a range that they can be corrected. Also, some types of artifacts might not be correctable either through changing the protocol or through post-processing.

Accordingly, the only remaining question is whether these uncorrectable artifacts are small enough that they can be tolerated, or whether these uncorrectable artifacts are too big and therefore fatal. To determine, whether or not the uncorrectable artifacts are fatal, the artifact indicia from the sinogram and image CNNs can be compared with respective fatal thresholds corresponding to the types of the uncorrectable artifacts.

The choice for the fatal thresholds and the correctable thresholds can be guided by training the DL networks using target data that includes user defined labels indicating whether the respective pieces of input data include artifacts that are correctable or fatal.

For example, a particular type of artifact can be indicated by a sinogram CNN returning a value ranging from zero to ten, with zero being no artifact and ten being a very large artifact. The thresholds for the artifact indicator returned by the sinogram CNN can be set to three for the detection threshold, five for the correctable threshold, and seven for the fatal thresholds. Thus, when a sinogram in the input data is labelled by a user as having the type of artifact detected but the artifact is neither fatal nor uncorrectable, the sinogram CNN will learn to assign this and other sinograms with similarly egregious artifacts to an artifact indicator value between three and five. For a sinogram in which the type of artifact is detected and uncorrectable but not fatal, the sinogram CNN will learn to assign this and other sinograms with similarly egregious artifacts to an artifact indicator value between five and seven. Finally, for a sinogram in which the type of artifact is detected, uncorrectable, and fatal, the sinogram CNN will learn to assign this and other sinograms with similarly egregious artifacts to an artifact indicator value greater than seven.

In other implementations, a different artifact indicator for each determination of whether or not an artifact is detected, uncorrectable, and fatal. Thus, each type of artifact can be represented by multiple indicia from the sinogram CNN.

The above discussion for the sinogram CNN can also apply to the image CNN.

Now a discussion of various types of artifacts is provided.

Streak artifacts are often observed around materials that block most X-rays, such as metal or bone. Numerous factors contribute to these streaks: undersampling, photon starvation, motion, beam hardening, and Compton scatter. This type of artifact commonly occurs in the posterior fossa of the brain, or if there are metal implants. Further, streaks can be observed in images reconstructed using filtered back-projection (FBP), and can be reduced by reconstructing the image using iterative reconstruction (IR) methods with regularization (e.g., total variation (TV) regularization).

Metal objects in the scan field can cause severe streaking artifacts. These artifacts result from the high attenuation of the metal in comparison to the attenuation of a human body. Additionally, the metal can lead to beam hardening, noise, scatter and partial volume artifacts. Metal artifacts can be avoided if removable metal objects such as jewelry is taken of before CT examination. If the metal objects are nonremovable (e.g., a medical implant in the patient that is made of metal), the metal can be excluded from the scans with gantry angulation. Furthermore, software corrections with various interpolation techniques enable the removal of streaking artifacts introduced by metal Streaks and other artifacts due to metal implants can be addressed using metal artifact reduction (MAR), as discussed in U.S. patent application Ser. No. 14/746,012, which is incorporated herein by reference in its entirety. MAR techniques include spectral imaging, where CT images are taken with photons of different energy levels, and then synthesized into monochromatic images.

Partial-volume artifacts can appear as blurring of edges. Partial-volume artifacts are due to the scanner being unable to differentiate between a small amount of high-density material (e.g., bone) and a larger amount of lower density (e.g., cartilage). The reconstruction assumes that the X-ray attenuation within each voxel is homogenous; this may not be the case at sharp edges. This is most commonly seen in the z-direction, due to the conventional use of highly anisotropic voxels, which have a much lower out-of-plane resolution, than in-plane resolution. This can be partially overcome by scanning using thinner slices, or an isotropic acquisition on a modern scanner.

Partial-volume artifacts occur when high attenuation structures do not cover the entire acquisition slice of the volume, i.e., only a part of a pixel of the detector. Since common detectors detect the deposited energy in each pixel element, an inherent spatial averaging is performed which leads to a discrepancy between the measured and the true intensities and consequently also of the attenuation values. Furthermore, partial volume artifacts appear when within the same reconstructed voxel, materials with different absorption coefficients are represented. Partial volume artifacts can be reduced by using a thin acquisition section width, as discussed in U.S. patent application Ser. No. 16/182,156, which is incorporated herein by reference in its entirety. Also, algorithms can be used correct partial-volume artifacts.

Ring artifact is a commonly occurring mechanical artifact in which one or more rings appears within an image. These rings can be caused by the variations in the response from individual elements in a two dimensional X-ray detector due to defect or an incorrect calibration. Ring artifacts can be reduced by intensity normalization, also referred to as flat field correction. Remaining rings can be suppressed by a transformation to polar space, where they become linear stripes. In certain implementations, ring artifacts can be reduced using the method of Sijbers and Postnov. Often, ring artifacts are concentrically arranged, exactly circular rings that alternately appear darker or brighter in a CT-image. They result either from a malfunction or an insufficient calibration of the detector. Because of the consistent occurrence of mismeasurements over each angle position circular rings appear in the CT-images (i.e., for instance, a defective pixel is displayed in each projection at the same position within the image). A correct calibration of the detector prevents the occurrence of ring artifacts.

Photon-starvation artifacts can results in increased image noise in certain image sections. Photon-starvation artifacts can be caused by an increased attenuation of the X-ray radiation due to differences in the morphology (e.g., a diminished signal-to-noise ratio). In the reconstructed volume the noise leads to stripes in CT-images. Photon starvation artifacts can be reduced by increasing the current of the tube. This can lead in medical application to an unnecessary high dose of radiation. Alternatively, an automatic tube current modulation, based on how much material the radiation has to pass through, or an adaptive filtration can be used to avoid these artifacts.

Windmill artifacts can occur when the detectors intersect the reconstruction plane. This can be reduced with filters or a reduction in pitch. Helical artifacts result from the interpolation of the measurement data, which is a requirement for the reconstruction of the spiral CT projections. These artifacts have a windmill-like appearance because several rows of detectors intersect the plane of reconstruction during the path of each rotation. Helical artifacts can be reduced by using thin acquisition sections.

Beam hardening artifacts can result in a cupped appearance when grayscale is visualized as height. It occurs because conventional sources, like X-ray tubes emit a polychromatic spectrum. Photons of higher photon energy levels are typically attenuated less. Because of this, the mean energy of the spectrum increases when passing the object, often described as getting harder (i.e., the X-rays appear to be attenuated less at the end of their trajectory than at the beginning). This leads to an effect increasingly underestimating material thickness, if not corrected. Various algorithms can be used to correct for this artifact, and can be applied to the sinogram, when it is detected. Algorithms to correct for this artifact can be divided in mono- and multi-material methods. Correcting beam-hardening artifacts can be easier to correct in the sinogram domain than in the image domain.

Regarding motion artifacts, these artifacts occur if a patient moves during the scan. The patient motion can be involuntary or voluntary. Involuntary motion is for example the movement of the heart or the chest through breathing. Artifacts caused by voluntary motion can be avoided by positioning aids or using a shorter scan time. A shorter scan time reduces also involuntary motion artifacts. Moreover, artifact caused by heart movement can be diminished by an EKG-triggered CT protocol and artifacts through breathing can be reduced by instructing the patient to hold his breath. Certain types of motion, such as a shift in posture, can be corrected through registration between those projection images taken before and after the motion. Sometimes, the motion artifact will be fatal, and the remedy is to repeat the scan with the patient staying still.

Regarding truncation artifacts, an incomplete projection appears when a part of the projection is not available for reconstruction. In medical applications centering the patient in the scanning field of view is not always possible. As a result, a portion of the projections are truncated. The truncated projections produce through the reconstruction bright shading artifacts. Artifacts by incomplete projections can be avoided by centering the patient or the object in the scanning field of view. However, sometimes projection truncation is unavoidable. Algorithms can be used to estimate/extrapolate the portion of the patient located outside of the field of view, and thereby correct the artifact, as discussed in U.S. patent application Ser. No. 16/206,892, which is incorporated herein by reference in its entirety.

Cone beam effect artifacts result from the geometry of the X-ray beam at multichannel detectors. The X-Rays diverge on their path from the tube to the detector. In the reconstruction algorithm is a however a parallel beam geometry assumed. This leads to a conically shaped distortion of the voxel. Cone-beam reconstruction/correction algorithms can be used to reduce these artifacts. For example, U.S. patent application Ser. No. 16/370,230, which is incorporated herein by reference in its entirety, describes a cone-beam artifact reduction method based on a DL network.

As can be seen from the above discussion, various types of artifacts can be addressed/corrected through changing the scan protocol, and other types of artifacts can be addressed/corrected through algorithms to post-processing the sinogram and/or images. Additionally, some types of artifacts can be partially addressed/corrected through changing the scan protocol, and then further corrected through post-processing. For some types of artifacts (e.g., beam hardening), post-processing to correct the artifacts is more effective in the sinogram domain, and, for other types of artifacts (e.g., metal artifacts), post-processing to correct the artifacts is more effective in the image domain.

In addition to the non-DL-based artifact-correction methods described above, post-processing to correct the artifacts can be performed using a DL network (e.g., a CNN) that has been trained to correct the particular type of artifact at issue. The artifact-correction CNN is trained using training data that includes input data exhibiting the artifact together with target data that does not exhibit the artifact. For an artifact-correction CNN in the sinogram domain, the input data is sinograms that exhibit the particular artifact, and the target data is corresponding sinograms in which the artifact is reduced or absent. For an artifact-correction CNN in the image domain, the input data is reconstructed images that exhibit the particular artifact, and the target data is corresponding reconstructed images in which the artifact is reduced or absent.

Figure 4:
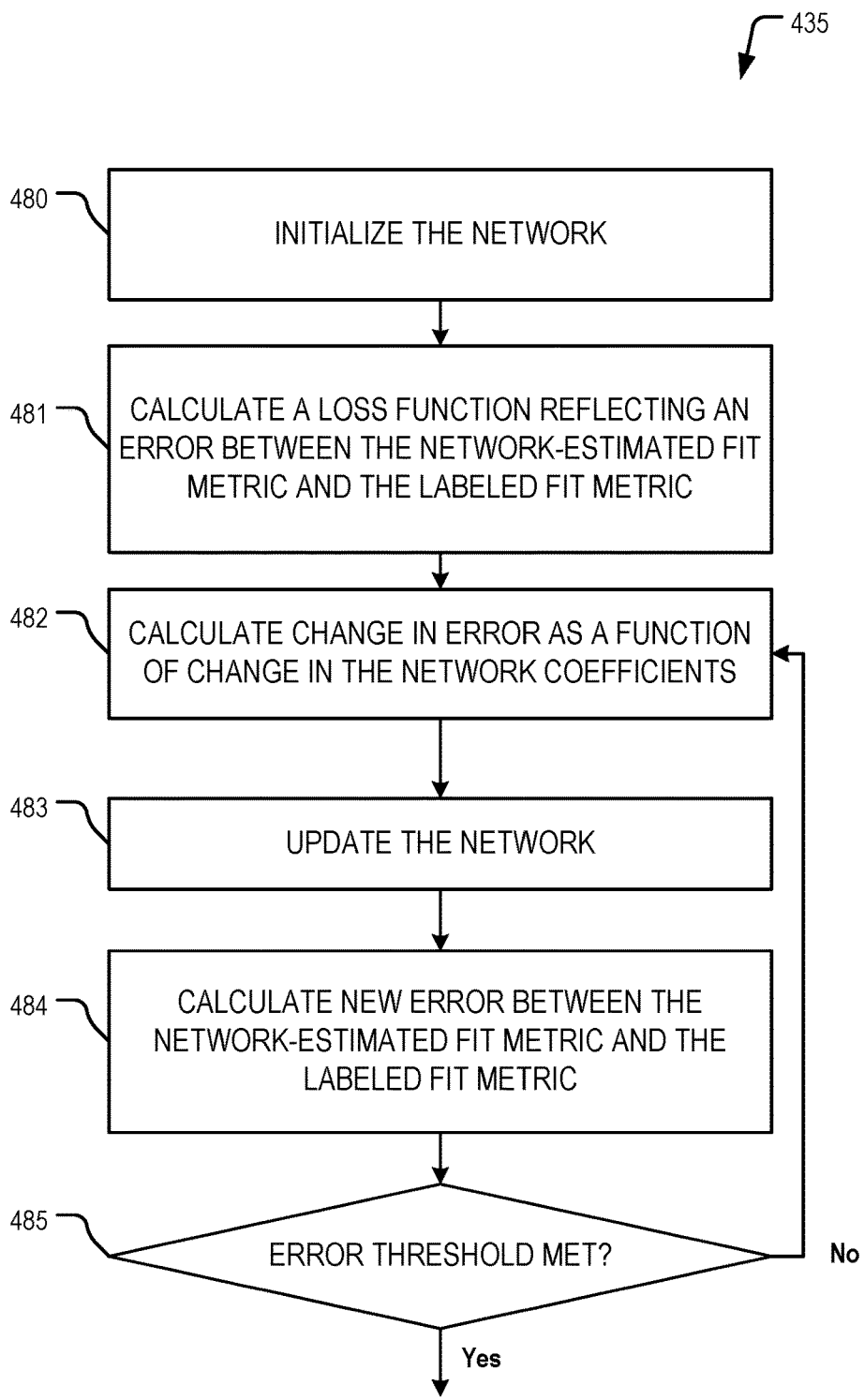
FIG. 4 shows a flow diagram of process for training DL networks, according to one implementation.

FIG. 4 is a non-limiting example of an implementation of training process 435 for training the neural network using the training data. The training process 435 can be used for training each of the DL networks (i.e., CNNs) described above using appropriately selected training data. As described above, the training data can comprise a plurality of labeled input images or sinograms (e.g., labeled to indicate whether or not the input data includes a detectable, correctable, and/or fatal artifact of a particular type, wherein these labels are/correspond to the target data), or the training data can include input sinogram/images exhibiting a particular artifact together with target sinogram/images that are free from the particular artifact.

In operation 480 of process 435, an initial guess is generated for the coefficients of the neural network. For example, the initial guess can be based on a priori knowledge of the data being collected and relevant indicators therein. Additionally, the initial guess can be based on one of the LeCun initialization, an Xavier initialization, and a Kaiming initialization.

Operation 481 of process 435 provides a non-limiting example of an optimization method for training the neural network. In operation 481 of process 435, an error is calculated (e.g., using a loss function or a cost function) to represent a measure of the difference (e.g., a distance measure) between the labeled data (i.e., ground truth) and the output data of the neural network as applied in a current iteration of the neural network. The error can be calculated using any known cost function or distance measure between the training data. Further, in certain implementations the error/loss function can be calculated using one or more of a hinge loss and a cross-entropy loss. In an example, the loss function can be defined as the mean square error between the output of the neural network ($S_{NN}$) and the labeled ground truth data ($S_{AGT}$), or $$\frac{1}{n}\sum_{i=1}^{n} \|S_{AGT} - S_{NN}\|^2$$

where n is the number for the training object. This loss can be minimized using optimization methods including, among others, stochastic gradient descent.

Additionally, the loss function can be combined with a regularization approach to avoid overfitting the network to the particular instances represented in the training data. Regularization can help to prevent overfitting in machine learning problems. If trained too long, and assuming the model has enough representational power, the network will learn the noise specific to that dataset, which is referred to as overfitting. In case of overfitting, the neural network becomes a poor generalization, and the variance will be large because the noise varies between datasets. The minimum total error occurs when the sums of bias and variance are minimal. Accordingly, it is desirable to reach a local minimum that explains the data in the simplest possible way to maximize the likelihood that the trained network represents a general solution, rather than a solution particular to the noise in the training data. This goal can be achieved by, for example, early stopping, weight regularization, lasso regularization, ridge regularization, or elastic net regularization.

In certain implements the neural network is trained using backpropagation. Backpropagation can be used for training neural networks and is used in conjunction with gradient descent optimization methods. During a forward pass, the algorithm computes the network's predictions based on the current parameters Θ. These predictions are then input into the loss function, by which they are compared to the corresponding ground truth labels (i.e., labeled data). During the backward pass, the model computes the gradient of the loss function with respect to the current parameters, after which the parameters are updated by taking a step size of a predefined size in the direction of minimized loss (e.g., in accelerated methods, such that the Nesterov momentum method and various adaptive methods, the step size can be selected to more quickly converge to optimize the loss function.)

The optimization method by which the backpropagation is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, e.g., Nesterov momentum technique or an adaptive method, such as Adagrad sub-gradient method, an Adadelta or RMSProp parameter update variation of the Adagrad method, and an Adam adaptive optimization technique. The optimization method can also apply a second order method by incorporating the Jacobian matrix into the update step.

The forward and backward passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to the non-limiting example shown in FIG. 4, operation 482 of process 435 determines a change in the error as a function of the change in the network can be calculated (e.g., an error gradient) and this change in the error can be used to select a direction and step size for a subsequent change in the weights/coefficients of the neural network. Calculating the gradient of the error in this manner is consistent with certain implementations of a gradient descent optimization method. In certain other implementations, this operation can be omitted and/or substituted with another operation in accordance with another optimization algorithm (e.g., a non-gradient descent optimization algorithm like simulated annealing or a genetic algorithm), as would be understood by one of ordinary skill in the art.

In operation 483 of process 435, a new set of coefficients are determined for the neural network. For example, the weights/coefficients can be updated using the change calculated in operation 482, as in a gradient descent optimization method or an over-relaxation acceleration method.

In operation 484 of process 435, a new error value is calculated using the updated weights/coefficients of the neural network.

In operation 485 of process 435, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations are reached. When the stopping criteria are not satisfied the training process performed in process 435 will continue back to the start of the iterative loop by returning and repeating operation 482 using the new weights and coefficients (the iterative loop includes operations 482, 483, 484, and 485). When the stopping criteria are satisfied, the training process performed in process 435 is completed.

With regard to the CNN architecture, generally, convolutional layers are placed close to the input layer, whereas fully connected layers, which perform the high-level reasoning, are placed further down the architecture towards the loss function. Pooling layers can be inserted after convolutions and provide a reduction in the spatial extent of the filters, and thus the amount of learnable parameters. Batch normalization layers regulate gradient distractions to outliers and accelerate the learning process. Activation functions are also incorporated into various layers to introduce non-linearity and enable the network to learn complex predictive relationships. The activation function can be a saturating activation function (e.g., a sigmoid or hyperbolic tangent activation function) or rectified activation function (e.g., ReLU discussed above).

Figure 5:
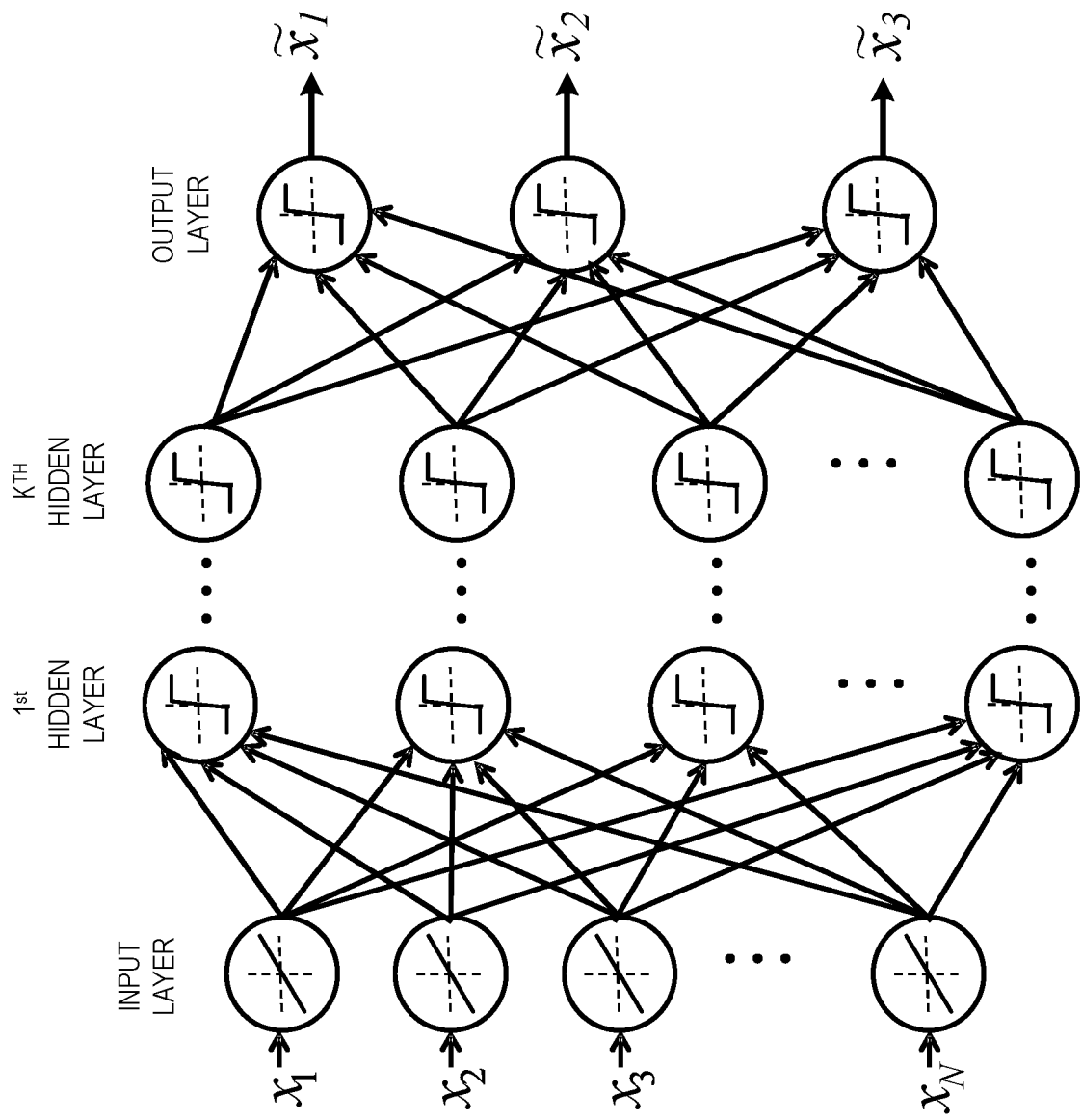
FIG. 5 shows a diagram of a feed-forward artificial neural network (ANN), according to one implementation.

FIG. 5 shows an example of the inter-connections between layers in an artificial neural network (ANN), which can also be referred to as a DL network, and a CNN is a particular type of ANN that includes convolutional layers. The ANN can include fully connected, and, in the particular case of a CNN, can include convolutional, pooling, batch normalization, and activation layers, which are explained above and below. In an embodiment, the convolutional neural network layers can be embedded within the ANN. Alternatively, the convolutional neural network can be arranged in series with the ANN, e.g., with the output layer of the CNN defining, in part, an input layer of the ANN. The arrangement of the convolutional neural network relative to the ANN is important in as much as the convolutional neural network provides, in part, processed input images to the input layer of the ANN.

FIG. 5 shows an example of a general ANN having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers and is called an autoencoder. The CNN of the present disclosure can have more than three layers of neurons and have as many output neurons $\mathcal{H}$ as input neurons, wherein N is the number of data entries in the processed input image data. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can be further defined as a composition of other functions. This can be conveniently represented as a network structure, with arrows depicting the dependencies between variables, as shown in FIG. 5. For example, the ANN can use a nonlinear weighted sum, wherein $m(x)=K(\Sigma_i w_i n_i(x))$ and where K (commonly referred to as the activation function) is some predefined function, such as the hyperbolic tangent.

In FIG. 5, the neurons (i.e., nodes) are depicted by circles around a threshold function. For the non-limiting example shown in FIG. 5, the inputs are depicted as circles around a linear function and the arrows indicate directed communications between neurons. In certain implementations, the ANN is a feedforward network.

The ANN of the present disclosure operates to achieve a specific task, by searching within the class of functions F to learn, using a set of observations, to find $m^* \in F$, which solves the specific task in some optimal sense (e.g., meets the stopping criteria used in operation 485 of process 435 discussed above). For example, in certain implementations, this can be achieved by defining a cost function $C:F \to m$ such that, for the optimal solution $m^*$, $C(m^*) \leq C(m) \forall m \in F$ (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

Figure 6:
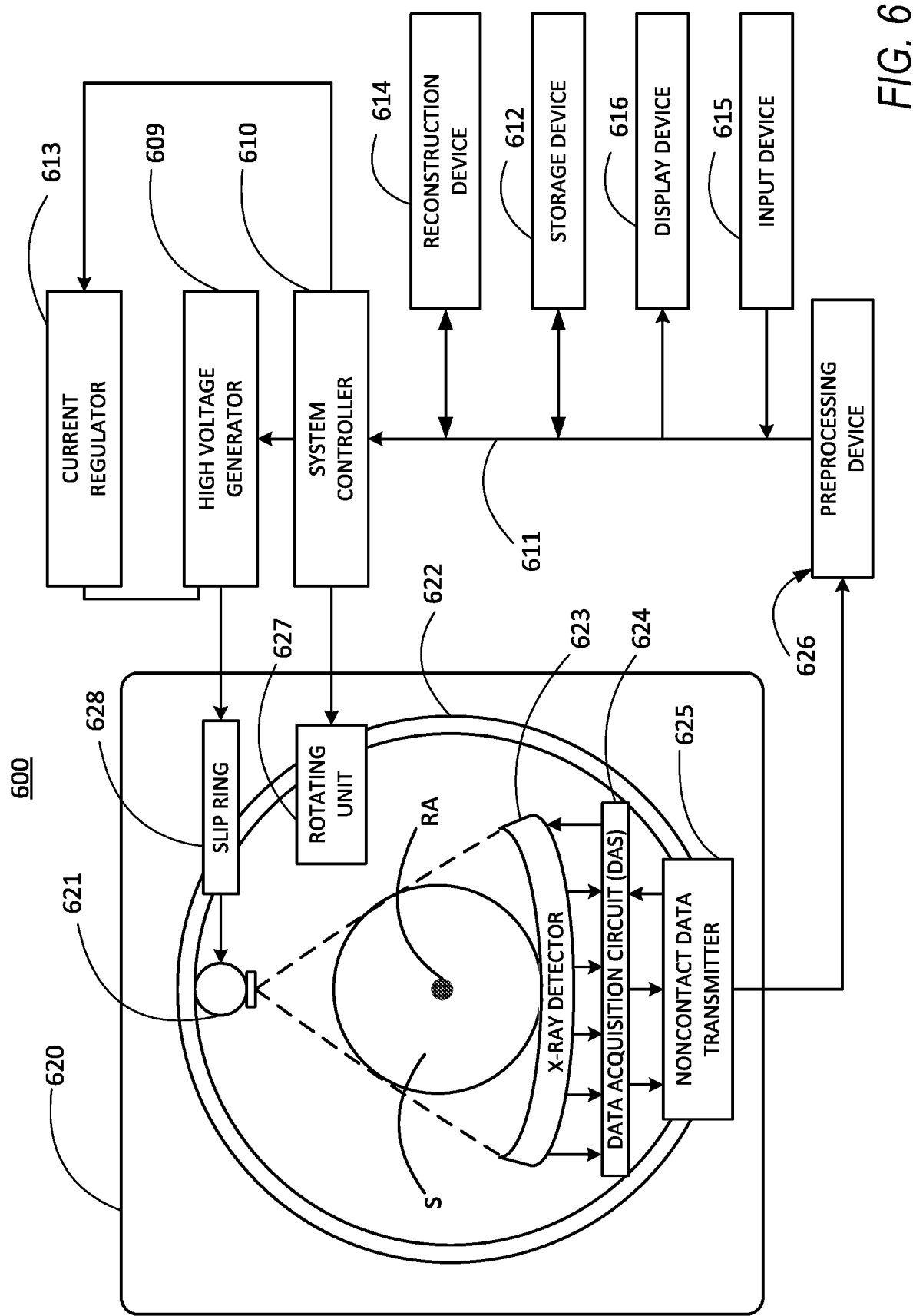
FIG. 6 shows hardware configuration of an X-ray computed tomography (CT) scanner, according to one implementation.

FIG. 6 illustrates a non-limiting example of a CT scanner 600. As shown in FIG. 6, a radiography gantry 620 is illustrated from a side view and further includes an X-ray tube 621, an annular frame 622, and a multi-row or two-dimensional-array-type X-ray detector 623. The X-ray tube 621 and X-ray detector 623 are diametrically mounted across an object OBJ on the annular frame 622, which is rotatably supported around a rotation axis RA.

The multi-slice X-ray CT apparatus further includes a high voltage generator 609 that generates a tube voltage applied to the X-ray tube 621 through a slip ring 628 so that the X-ray tube 621 generates X-rays. The X-rays are emitted towards the object OBJ, whose cross sectional area is represented by a circle. For example, the X-ray tube 621 having an average X-ray energy during a first scan that is less than an average X-ray energy during a second scan. Thus, two or more scans can be obtained corresponding to different X-ray energies. The X-ray detector 623 is located at an opposite side from the X-ray tube 621 across the object OBJ for detecting the emitted X-rays that have transmitted through the object OBJ. The X-ray detector 623 further includes individual detector elements or units.

The CT apparatus further includes other devices for processing the detected signals from X-ray detector 623. A data acquisition circuit or a Data Acquisition System (DAS) 624 converts a signal output from the X-ray detector 623 for each channel into a voltage signal, amplifies the signal, and further converts the signal into a digital signal.

The above-described data is sent to a preprocessing circuitry 626, which is housed in a console outside the radiography gantry 620 through a non-contact data transmitter 625. The preprocessing circuitry 626 performs certain corrections, such as sensitivity correction on the raw data. A storage 612 stores the resultant data, which is also called projection data at a stage immediately before reconstruction processing. The storage 612 is connected to a processing circuitry 610 through a data/control bus 611, together with a reconstruction device 614, input interface 615, and display 616. The processing circuitry 610 controls a current regulator 613 that limits the current to a level sufficient for driving the CT system.

The detectors are rotated and/or fixed with respect to the patient among various generations of the CT scanner systems. In one implementation, the X-ray tube 621 and the X-ray detector 623 are diametrically mounted on the annular frame 622 and are rotated around the object OBJ as the annular frame 622 is rotated about the rotation axis RA.

The storage 612 can store the measurement value representative of the irradiance of the X-rays at the X-ray detector unit 623. Further, the storage 612 can store a dedicated program for executing various steps of methods 100 and 200 and various steps of process 435 for training the DL networks.

The reconstruction circuitry 614 can execute various steps of methods 100 and 200. Further, reconstruction circuitry 614 can execute pre-reconstruction processing image processing such as volume rendering processing and image difference processing as needed.

The pre-reconstruction processing of the projection data performed by the preprocessing circuitry 626 can include correcting for detector calibrations, detector nonlinearities, and polar effects, for example.

Post-reconstruction processing performed by the reconstruction circuitry 614 can include filtering and smoothing the image, volume rendering processing, and image difference processing as needed. The image reconstruction process can implement various steps of methods 100 and 200. The reconstruction circuitry 614 can use the memory to store, e.g., projection data, reconstructed images, calibration data and parameters, and computer programs.

The various circuitry (e.g., the reconstruction circuitry 614 and preprocessing circuitry 626) can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the storage 612 can be non-volatile, such as ROM, EPROM, EEPROM or FLASH memory. The storage 612 can also be volatile, such as static or dynamic RAM, and a processor, such as a microcontroller or microprocessor, can be provided to manage the electronic memory as well as the interaction between the FPGA or CPLD and the memory.

In one implementation, the reconstructed images can be displayed on a display 616. The display 616 can be an LCD display, CRT display, plasma display, OLED, LED or any other display known in the art.

Figure 7:
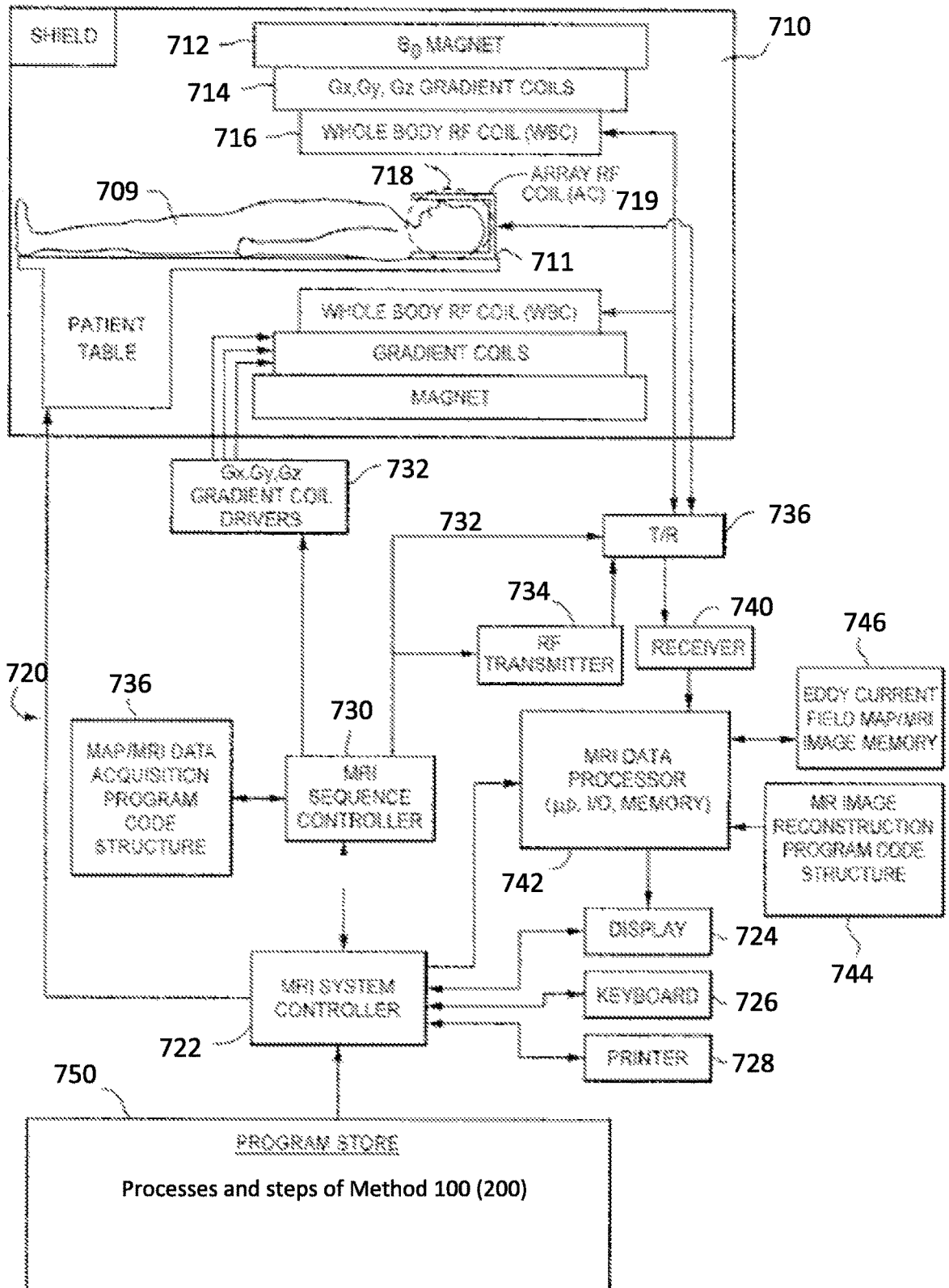
FIG. 7 shows hardware configuration of a magnetic resonance imaging (MRI) scanner according to one implementation.

FIG. 7 shows a non-limiting example of a magnetic resonance imaging (MRI) system 700. The MRI system 700 depicted in FIG. 7 includes a gantry 701 (shown in a schematic cross-section) and various related system components 703 interfaced therewith. At least the gantry 701 is typically located in a shielded room. The MRI system geometry depicted in FIG. 7 includes a substantially coaxial cylindrical arrangement of the static field $B_0$ magnet 711, a Gx, Gy, and Gz gradient coil set 713, and a large whole-body RF coil (WBC) assembly 715. Along a horizontal axis of this cylindrical array of elements is an imaging volume 717 shown as substantially encompassing the head of a patient 719 supported by a patient table 720.

One or more smaller array RF coils 721 can be more closely coupled to the patient's head (referred to herein, for example, as "scanned object" or "object") in imaging volume 717. As those in the art will appreciate, compared to the WBC (whole-body coil), relatively small coils and/or arrays, such as surface coils or the like, are often customized for particular body parts (e.g., arms, shoulders, elbows, wrists, knees, legs, chest, spine, etc.). Such smaller RF coils are referred to herein as array coils (AC) or phased-array coils (PAC). These can include at least one coil configured to transmit RF signals into the imaging volume, and a plurality of receiver coils configured to receive RF signals from an object, such as the patient's head, in the imaging volume.

The MRI system 700 includes a MRI system controller 730 that has input/output ports connected to a display 724, a keyboard 726, and a printer 728. As will be appreciated, the display 724 can be of the touch-screen variety so that it provides control inputs as well. A mouse or other I/O device(s) can also be provided.

The MRI system controller 730 interfaces with a MRI sequence controller 740, which, in turn, controls the Gx, Gy, and Gz gradient coil drivers 732, as well as the RF transmitter 734, and the transmit/receive switch 736 (if the same RF coil is used for both transmission and reception). The MRI sequence controller 740 includes suitable program code structure 738 for implementing MRI imaging (also known as nuclear magnetic resonance, or NMR, imaging) techniques including parallel imaging. MRI sequence controller 740 can be configured for MR imaging with or without parallel imaging. Moreover, the MRI sequence controller 740 can facilitate one or more preparation scan (pre-scan) sequences, and a scan sequence to obtain a main scan magnetic resonance (MR) image (referred to as a diagnostic image). MR data from pre-scans can be used, for example, to determine sensitivity maps for RF coils 715 and/or 721 (sometimes referred to as coil sensitivity maps or spatial sensitivity maps), and to determine unfolding maps for parallel imaging.

The MRI system components 703 include an RF receiver 741 providing input to data processor 742 so as to create processed image data, which is sent to display 724. The MRI data processor 742 is also configured to access previously generated MR data, images, and/or maps, such as, for example, coil sensitivity maps, parallel image unfolding maps, distortion maps and/or system configuration parameters 746, and MRI image reconstruction program code structures 744 and 750. The program code structure 750 stores instructions to perform various steps of methods 100 and 200 and various steps of process 435 for training the DL networks.

In one embodiment, the MRI data processor 742 includes processing circuitry. The processing circuitry can include devices such as an application-specific integrated circuit (ASIC), configurable logic devices (e.g., simple programmable logic devices (SPLDs), complex programmable logic devices (CPLDs), and field programmable gate arrays (FPGAs), and other circuit components that are arranged to perform the functions recited in the present disclosure.

The processor 742 executes one or more sequences of one or more instructions contained in the program code structures 744 and 750. Alternatively, the instructions can be read from another computer-readable medium, such as a hard disk or a removable media drive. One or more processors in a multi-processing arrangement can also be employed to execute the sequences of instructions contained in the program code structures 744 and 750. In alternative embodiments, hard-wired circuitry can be used in place of or in combination with software instructions. Thus, the disclosed embodiments are not limited to any specific combination of hardware circuitry and software.

Additionally, the term "computer-readable medium" as used herein refers to any non-transitory medium that participates in providing instructions to the processor 742 for execution. A computer readable medium can take many forms, including, but not limited to, non-volatile media or volatile media. Non-volatile media includes, for example, optical, magnetic disks, and magneto-optical disks, or a removable media drive. Volatile media includes dynamic memory.

Also illustrated in FIG. 7 is a generalized depiction of an MRI system program storage (memory) 750, where stored program code structures are stored in non-transitory computer-readable storage media accessible to the various data processing components of the MRI system 700. As those in the art will appreciate, the program store 750 can be segmented and directly connected, at least in part, to different ones of the system 703 processing computers having most immediate need for such stored program code structures in their normal operation (i.e., rather than being commonly stored and connected directly to the MRI system controller 730).

Additionally, the MRI system 700 as depicted in FIG. 7 can be utilized to practice exemplary embodiments described herein below. The system components can be divided into different logical collections of "boxes" and typically comprise numerous digital signal processors (DSP), microprocessors and special purpose processing circuits (e.g., for fast A/D conversions, fast Fourier transforming, array processing, etc.). Each of those processors is typically a clocked "state machine" wherein the physical data processing circuits progress from one physical state to another upon the occurrence of each clock cycle (or predetermined number of clock cycles).

Figure 8A:
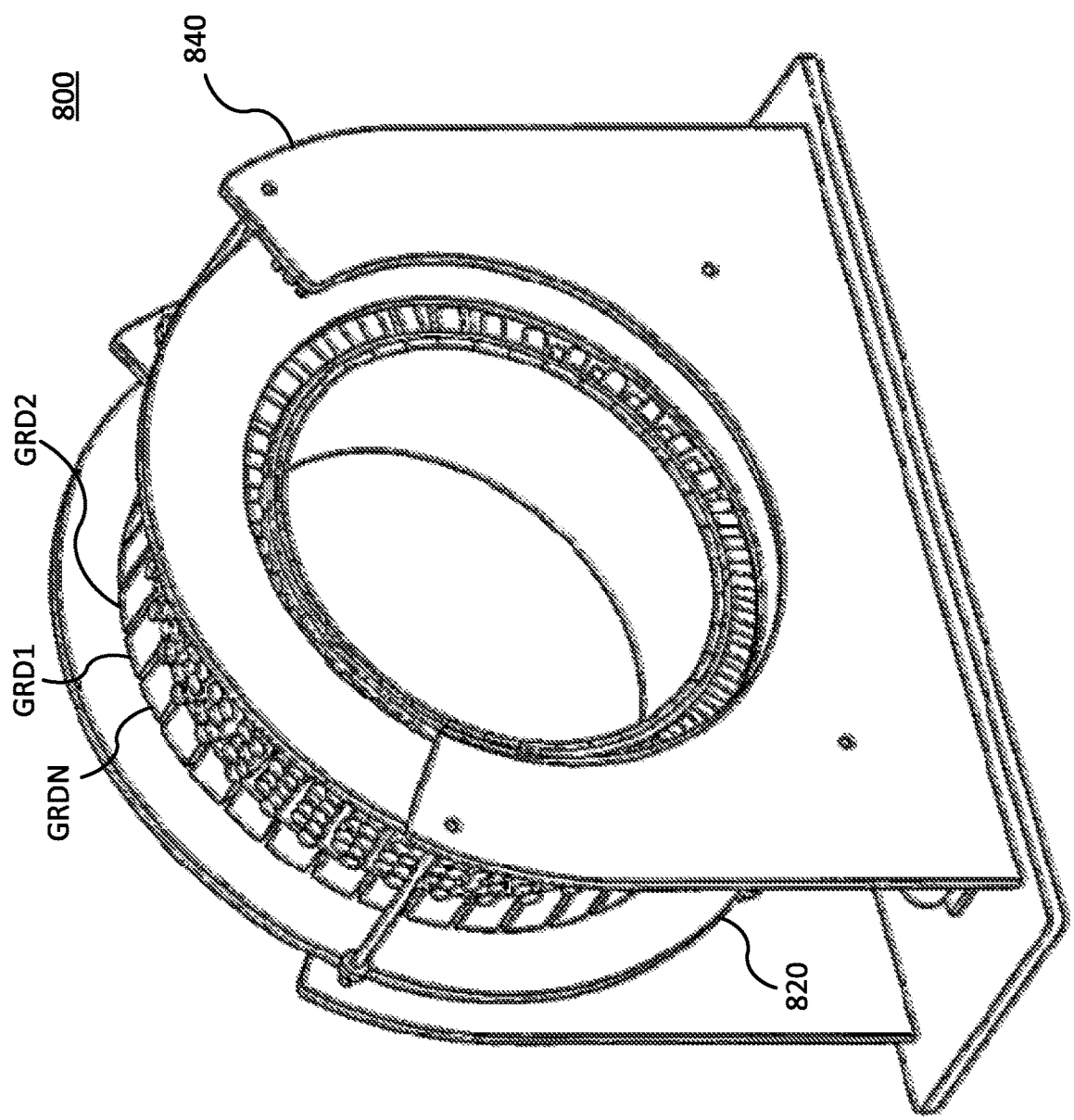
FIG. 8A shows perspective view of a positron emission tomography (PET) scanner, according to one implementation.
Figure 8B:
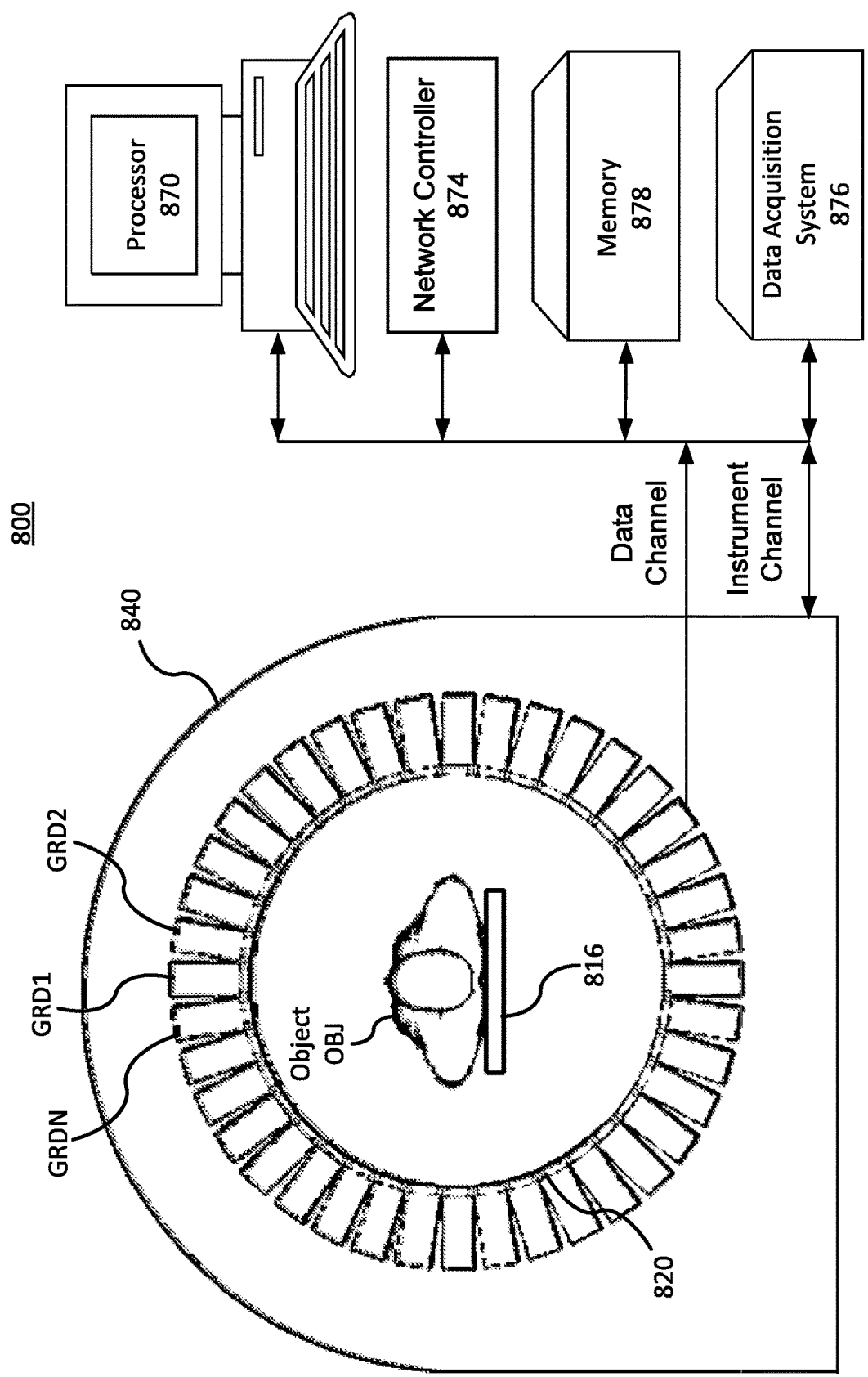
FIG. 8B shows hardware configuration of the PET scanner, according to one implementation.

FIGS. 8A and 8B illustrate a non-limiting example of a PET scanner 800 that implement various steps of methods 100 and 200 and various of the steps of process 435 for training the DL networks. The PET scanner 800 includes a number of gamma-ray detectors (GRDs) (e.g., GRD1, GRD2, through GRDN) that are each configured as rectangular detector modules.

Each GRD can include a two-dimensional array of individual detector crystals, which absorb gamma radiation and emit scintillation photons. The scintillation photons can be detected by a two-dimensional array of photomultiplier tubes (PMTs) or silicon photomultipliers (SiPMs). A light guide can be disposed between the array of detector crystals and the photodetectors.

FIG. 8B shows a schematic view of a PET scanner 800 having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 8A and 8B.

FIG. 8B shows an example of the arrangement of the PET scanner 800, in which the object OBJ to be imaged rests on a table 816 and the GRD modules GRD1 through GRDN are arranged circumferentially around the object OBJ and the table 816. The GRDs can be fixedly connected to a circular component 820 that is fixedly connected to the gantry 840. The gantry 840 houses many parts of the PET imager. The gantry 840 of the PET imager also includes an open aperture through which the object OBJ and the table 816 can pass, and gamma-rays emitted in opposite directions from the object OBJ due to an annihilation event can be detected by the GRDs and timing and energy information can be used to determine coincidences for gamma-ray pairs.

In FIG. 8B, circuitry and hardware is also shown for acquiring, storing, processing, and distributing gamma-ray detection data. The circuitry and hardware include: a processor 870, a network controller 874, a memory 878, and a data acquisition system (DAS) 876. The PET imager also includes a data channel that routes detection measurement results from the GRDs to the DAS 876, a processor 870, a memory 878, and a network controller 874. The data acquisition system 876 can control the acquisition, digitization, and routing of the detection data from the detectors. In one implementation, the DAS 876 controls the movement of the bed 816. The processor 870 performs functions including reconstructing images from the detection data, pre-reconstruction processing of the detection data, and post-reconstruction processing of the image data, as discussed herein. A combination of the DAS 876, the processor 870, and the memory 878 store instructions and perform the steps of methods 100 and 200 and of the process 435.

The processor 870 can be configured to perform various steps of method 10 described herein and variations thereof. The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 870 can execute a computer program including a set of computer-readable instructions that perform various steps of method 10, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the PET imager. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

Modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
processing circuitry configured to
acquire sinogram data representing an intensity of radiation detected by a plurality of detectors,
acquire a neural network,
apply the acquired sinogram data to the neural network to thereby output, from the neural network, indicia of two or more artifacts,
determine, based on the indicia from the neural network, whether or not a first artifact is exhibited by the acquired sinogram data and whether or not a second artifact is exhibited by the acquired sinogram data,
when one or more artifacts are determined to be exhibited by the acquired sinogram data, correct for the one or more artifacts that are determined to be exhibited by the acquired sinogram to thereby generate a corrected sinogram,
when the one or more artifacts that are determined to be exhibited by the acquired sinogram, reconstruct a computed tomography (CT) image from the corrected sinogram, and
when the one or more artifacts that are determined to not be exhibited by the acquired sinogram data, reconstruct the CT image from the acquired sinogram data.

2. The apparatus according to claim 1, where the processing circuitry is further configured to
determine whether or not at least one of the one or more artifacts are determined to be exhibited by the acquired sinogram is a fatal artifact, and
stop acquiring the sinogram data without reconstructing the CT image, when at least one of the one or more artifacts is fatal.

3. The apparatus according to claim 1, where the processing circuitry is further configured to
determine, based on the indicia from the neural network, whether or not at least one of the one or more artifacts that are determined to be exhibited by the acquired sinogram data can be mitigated by changing a protocol for acquiring the sinogram data, and when at least one of the one or more artifacts can be mitigated by changing the protocol, change the protocol for the acquiring of the sinogram data and continue acquiring the sinogram data using the changed protocol.

4. The apparatus according to claim 3, wherein the circuitry is further configured to train the another neural network by
obtaining a second training dataset comprising input sinograms paired with respective target sinograms, the input sinograms exhibiting the one or more artifacts that are determined to be exhibited by the acquired sinogram, and the target sinograms exhibiting less or none of the one or more artifacts that are determined to be exhibited by the acquired sinogram,
using the neural network to generate artifact-corrected sinograms from the respective input sinograms by applying the input sinograms to the another neural network, and iteratively adjusting weighting coefficients of the another neural network to minimize a value of a loss function, the loss function measuring a disagreement between a respective target sinogram and a corresponding artifact-corrected sinogram generated in response to applying a respective input sinogram to the another neural network.

5. The apparatus according to claim 3, wherein the processing circuitry is further configured to
acquire the sinogram data, wherein the sinogram data is X-ray projection data, and change the protocol by changing one or more of a current of an X-ray tube, a voltage of the X-ray tube, a cone-beam angle of an X-ray beam, a pitch of a helical scan, a calibration, and a pixel pitch of the plurality of detectors.

6. The apparatus according to claim 3, wherein the processing circuitry is further configured to
acquire the neural network, and the neural network has been trained to generate indicia indicating a change to the protocol for the acquiring of the sinogram data when the one or more artifacts that are determined to be exhibited by the acquired sinogram includes one or more of (i) a photon-starvation artifact, (ii) a windmill artifact, (iii) a ring artifact, (iv) a zebra artifact, (v) a partial-volume artifact, and/or (vi) a truncation artifact.

7. The apparatus according to claim 1, where the processing circuitry is further configured to
acquire another neural network, and
correct for the one or more artifacts that are determined to be exhibited by applying the acquired sinogram data to the another neural network thereby to generate an output from the another neural network as the corrected sinogram.

8. The apparatus according to claim 1, wherein the circuitry is further configured to train the neural network by
obtaining a first training dataset comprising input sinograms paired with respective target indicia indicating whether or not the first input sinograms exhibit one or more artifacts,
using the neural network to generate artifact indicia from the respective input sinograms by applying a given input sinogram to the neural network to generate corresponding artifact indicia, and
iteratively adjusting weighting coefficients of the neural network to minimize a value of a loss function, the loss function measuring a disagreement between the artifact indicia generated in response to a respective input sinogram of the first training dataset and corresponding target indicia of the first training dataset.

9. The apparatus according to claim 1, wherein the processing circuitry is further configured to
- acquire the neural network, and the neural network has been trained to generate indicia indicating whether two or more from the list of (i) a beam-hardening artifact, (ii) a ring artifact, (iii) a motion artifact, (iv) a metal artifact, (v) a photon-starvation artifact, (vi) a windmill artifact, (vii) a ring artifact, (viii) a zebra artifact, (ix) a partial-volume artifact, (x) a cupping artifact, (xi) a truncation artifact, (xii) a streak artifact, and/or (xiii) a shadowing artifact is exhibited by the sinogram data.

10. The apparatus according to claim 1, wherein the processing circuitry is further configured to acquire the sinogram data, wherein the sinogram data is one of X-ray projection data, positron emission tomography data, and single photon emission computed tomography data.

11. The apparatus according to claim 1, wherein the processing circuitry is further configured to
- acquire another neural network,
- apply the CT image to the another neural network to generate an output indicating whether a residual artifact is exhibited by the CT image, and
- signal to a user of the apparatus that the residual artifact is exhibited by the CT image, when the output from the another neural network indicates that the residual artifact is exhibited by the CT image.

12. The apparatus according to claim 1, wherein the processing circuitry is further configured to:
- acquire another neural network,
- apply the CT image to the another neural network to thereby output, from the another neural network, indicia of another two or more artifacts,
- determine, based on the indicia from the another neural network, whether or not a third artifact is exhibited by the CT image and whether or not a fourth artifact is exhibited by the CT image, and
- when another one or more artifacts are determined to be exhibited by the CT image, correct for the another one or more artifacts that are determined to be exhibited by the CT image to thereby generate a corrected image.

13. An apparatus comprising:
processing circuitry configured to
- acquire sinogram data representing an intensity of radiation detected by a plurality of detectors,
- reconstruct an image from the sinogram data,
- acquire a neural network,
- apply the reconstructed image to the neural network to thereby output indicia of two or more artifacts from the neural network,
- determine, based on the indicia from the neural network, whether or not a first artifact is exhibited by the reconstructed image and whether or not a second artifact is exhibited by the reconstructed image,
- when one or more artifacts are determined to be exhibited by the reconstructed image, correct for the one or more artifacts that are determined to be exhibited by the reconstructed image to thereby generate a corrected image,
- determine whether or not at least one of the one or more artifacts determined to be exhibited by the reconstructed image is a fatal artifact, and
- stop acquiring the sinogram data, when at least one of the one or more artifacts is fatal, otherwise continue acquiring the sinogram data.

14. An apparatus comprising:
processing circuitry configured to
- acquire sinogram data representing an intensity of radiation detected by a plurality of detectors,
- reconstruct an image from the sinogram data,
- acquire a neural network,
- apply the reconstructed image to the neural network to thereby output indicia of two or more artifacts from the neural network,
- determine, based on the indicia from the neural network, whether or not a first artifact is exhibited by the reconstructed image and whether or not a second artifact is exhibited by the reconstructed image,
- when one or more artifacts are determined to be exhibited by the reconstructed image, correct for the one or more artifacts that are determined to be exhibited by the reconstructed image to thereby generate a corrected image,
- determine, based on the indicia from the neural network, whether or not at least one of the one or more artifacts determined to be exhibited by the reconstructed image can be mitigated by changing a protocol for acquiring the sinogram data, and
- when at least one of the one or more artifacts can be mitigated by changing the protocol, change the protocol for the acquiring of the sinogram data and continue acquiring the sinogram data using the changed protocol.

15. The apparatus according to claim 14, wherein the circuitry is further configured to train the another neural network by
- obtaining a second training dataset comprising input images paired with respective target images, the input images exhibiting the one or more artifacts that are determined to be exhibited by the reconstructed image, and the target image s exhibiting less or none of the one or more artifacts that are determined to be exhibited by the reconstructed image,
- using the neural network to generate artifact-corrected images from the respective input images by applying the input images to the another neural network, and
- iteratively adjusting weighting coefficients of the another neural network to minimize a value of a loss function, the loss function measuring a disagreement between a respective target image and a corresponding artifact-corrected image generated in response to applying a respective input image to the another neural network.

16. An apparatus comprising:
processing circuitry configured to
- acquire sinogram data representing an intensity of radiation detected by a plurality of detectors,
- reconstruct an image from the sinogram data,
- acquire a neural network,
- apply the reconstructed image to the neural network to thereby output indicia of two or more artifacts from the neural network,
- determine, based on the indicia from the neural network, whether or not a first artifact is exhibited by the reconstructed image and whether or not a second artifact is exhibited by the reconstructed image,
- when one or more artifacts are determined to be exhibited by the reconstructed image, correct for the one or more artifacts that are determined to be exhibited by the reconstructed image to thereby generate a corrected image, acquire another neural network, and correct for the one or more artifacts determined to be exhibited by applying the reconstructed image to the another neural network to thereby generate an output from the another neural network as the corrected image.

17. An apparatus comprising:

processing circuitry configured to acquire sinogram data representing an intensity of radiation detected by a plurality of detectors, reconstruct an image from the sinogram data, acquire a neural network, apply the reconstructed image to the neural network to thereby output indicia of two or more artifacts from the neural network, determine, based on the indicia from the neural network, whether or not a first artifact is exhibited by the reconstructed image and whether or not a second artifact is exhibited by the reconstructed image, when one or more artifacts are determined to be exhibited by the reconstructed image, correct for the one or more artifacts that are determined to be exhibited by the reconstructed image to thereby generate a corrected image, and train the neural network by obtaining a first training dataset comprising input images paired with respective target indicia indicating whether or not the first input images exhibit one or more artifacts, using the neural network to generate artifact indicia from the respective input images by applying a given input image to the neural network to generate corresponding artifact indicia, and iteratively adjusting weighting coefficients of the neural network to minimize a value of a loss function, the loss function measuring a disagreement between the artifact indicia generated in response to a respective input image of the first training dataset and corresponding target indicia of the first training dataset.

18. A method, comprising:

acquiring sinogram data representing an intensity of radiation detected by a plurality of detectors, acquiring a neural network, applying the acquired sinogram data to the neural network to thereby output, from the neural network, indicia of two or more artifacts, determining, based on the indicia from the neural network, whether or not a first artifact is exhibited by the acquired sinogram data and whether or not a second artifact is exhibited by the acquired sinogram data, when one or more artifacts are determined to be exhibited by the acquired sinogram data, correcting for the one or more artifacts that are determined to be exhibited by the acquired sinogram to thereby generate a corrected sinogram, when the one or more artifacts that are determined to be exhibited by the acquired sinogram, reconstructing a computed tomography (CT) image from the corrected sinogram, and when the one or more artifacts that are determined to not be exhibited by the acquired sinogram data, reconstructing the CT image from the acquired sinogram data.

19. A non-transitory computer-readable storage medium including executable instructions, which when executed by circuitry, cause the circuitry to perform the method according to claim 18.

* * * * *